April 17, 1962
O. L. WEST
3,029,680
MUSICAL CALCULATOR
Filed Oct. 29, 1959
5 Sheets-Sheet 2
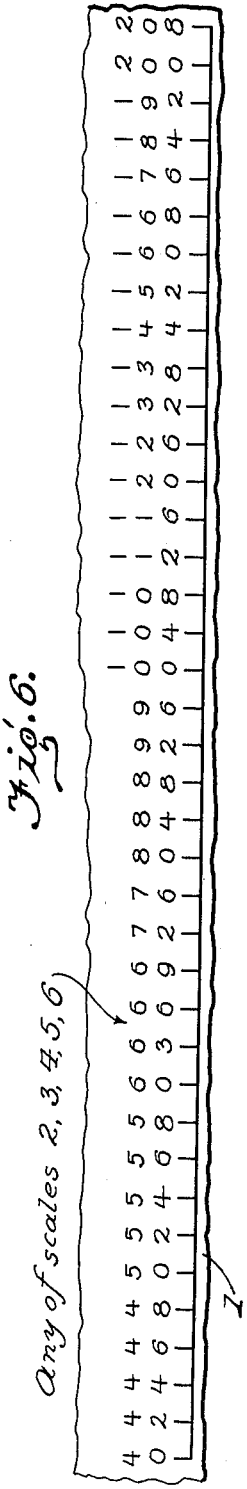
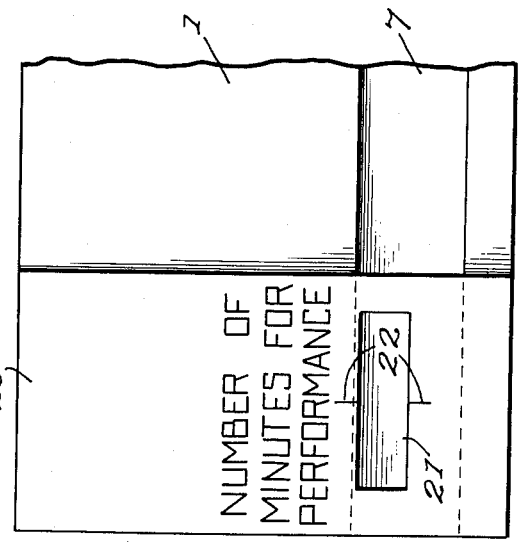
INVENTOR
Owen L. West
BY Lowry Rinehart
ATTORNEYS.

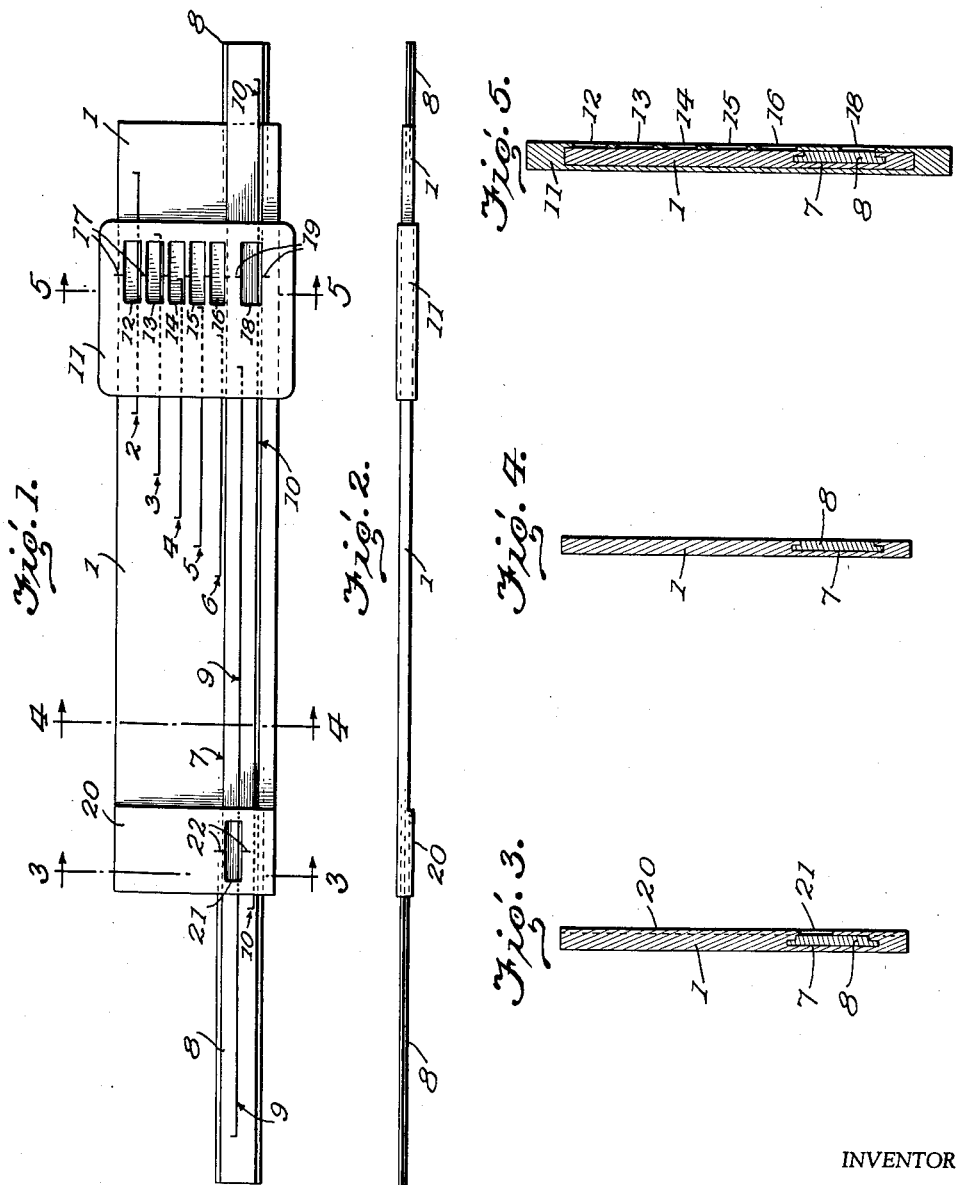

April 17, 1962 — O. L. WEST — 3,029,680
MUSICAL CALCULATOR
Filed Oct. 29, 1959 — 5 Sheets-Sheet 3
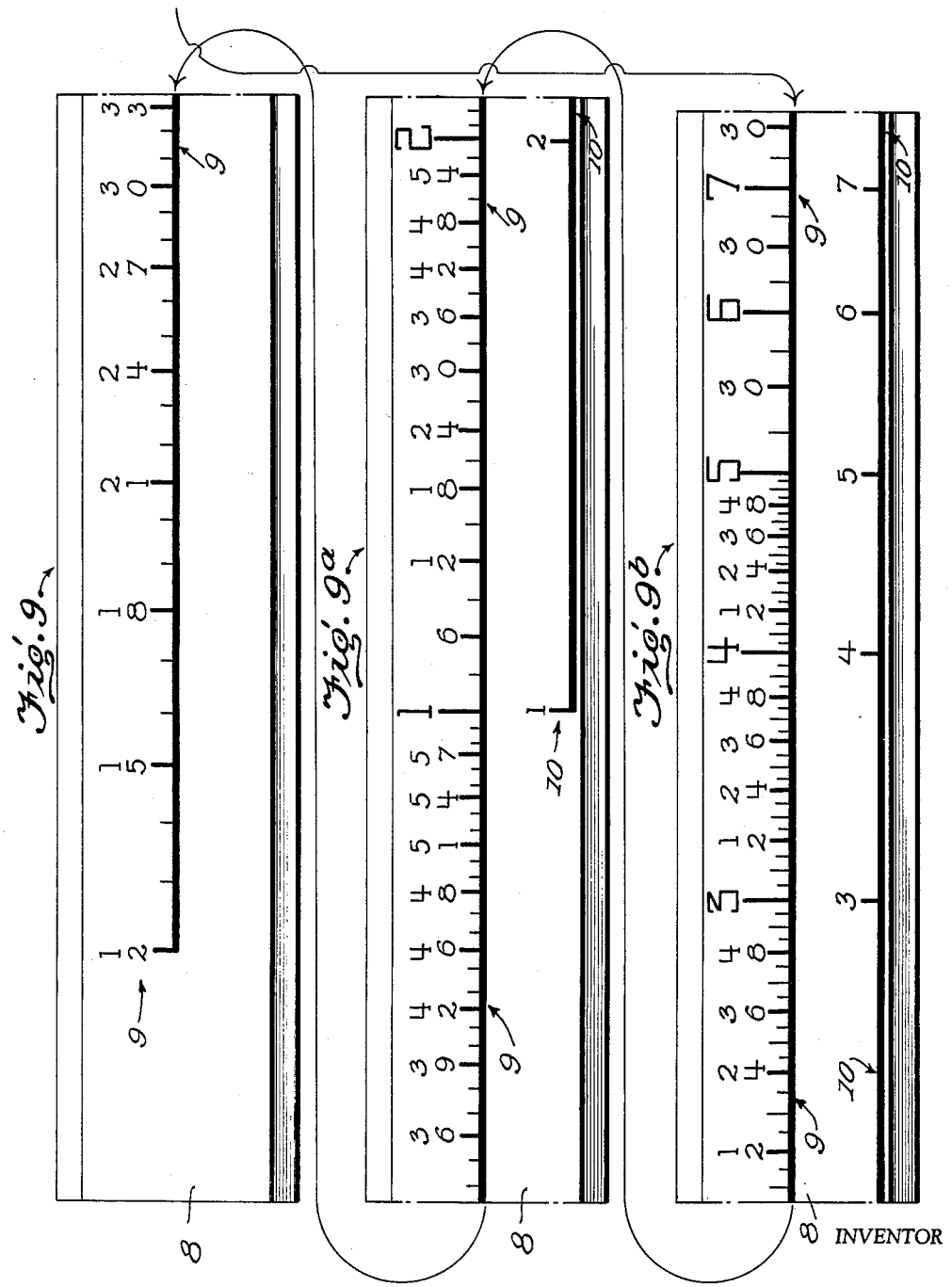
INVENTOR
Owen L. West
BY Lowry & Rinehart
ATTORNEYS April 17, 1962  O. L. WEST  3,029,680
MUSICAL CALCULATOR
Filed Oct. 29, 1959  5 Sheets-Sheet 4
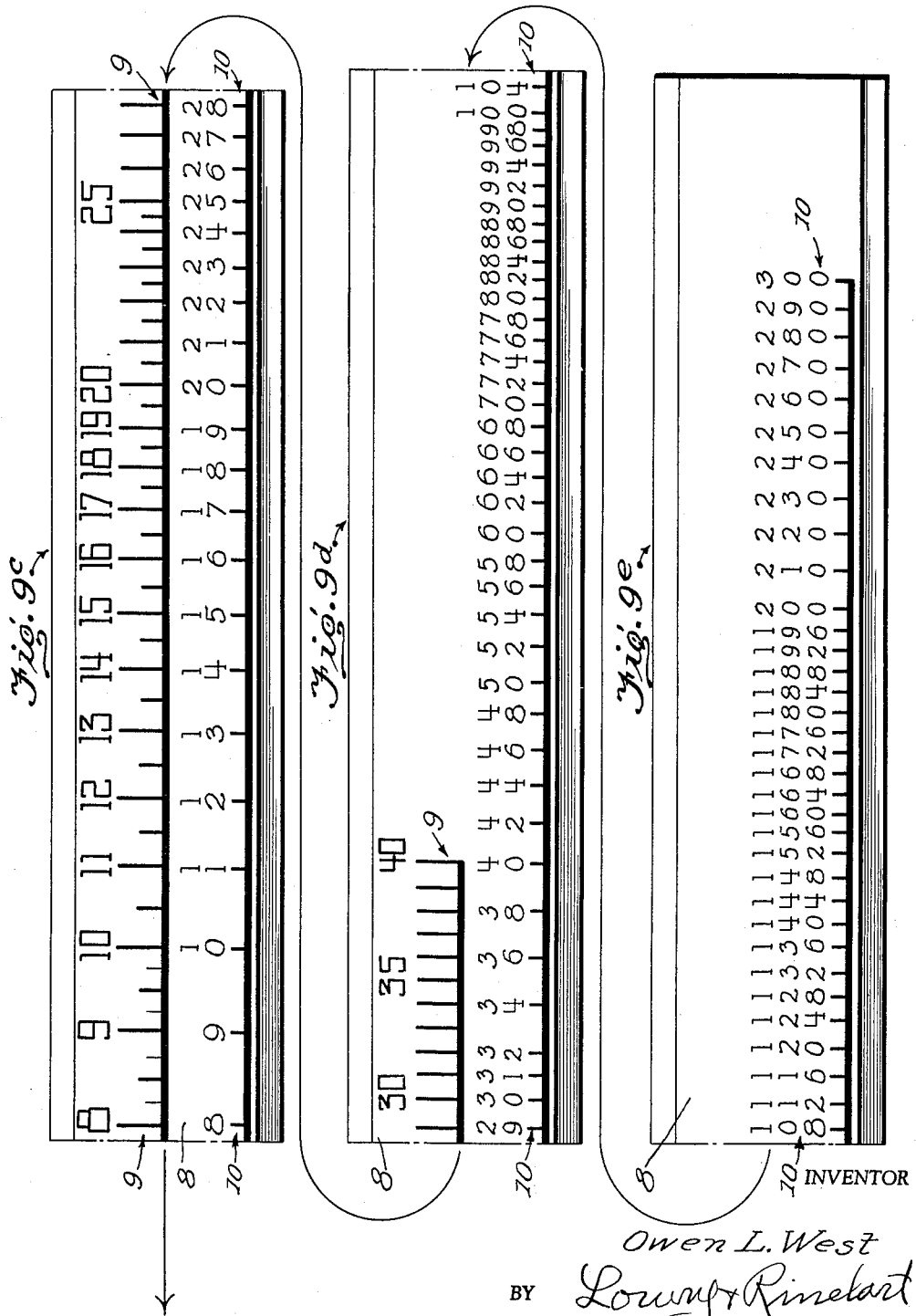
INVENTOR
Owen L. West
BY Lowry & Rinehart
ATTORNEYS.

April 17, 1962
O. L. WEST
3,029,680
MUSICAL CALCULATOR
Filed Oct. 29, 1959
5 Sheets-Sheet 5
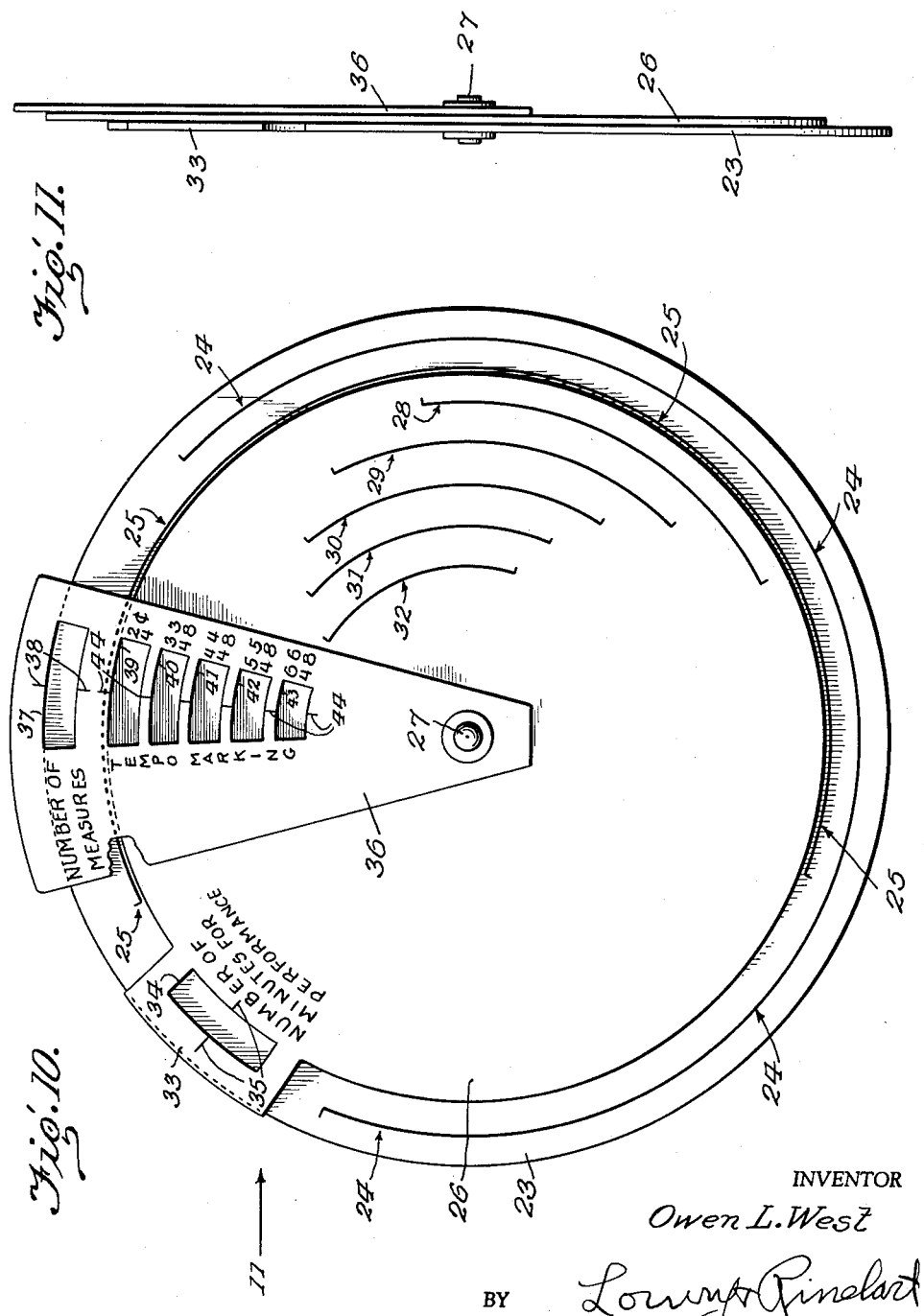
INVENTOR
Owen L. West
BY Lowry Rinehart
ATTORNEYS.

United States Patent Office

3,029,680
Patented Apr. 17, 1962

3,029,680
MUSICAL CALCULATOR
Owen L. West, Peoria, Ill.
(5 Willowbrook, Buckhannon, W. Va.)
Filed Oct. 29, 1959, Ser. No. 849,639
6 Claims. (Cl. 84—470)

The determination of the length of performance time of a musical composition has required the time consuming process of playing the composition and measuring its length in minutes and seconds. The purpose of my invention is to make it possible to determine the length of performance time without playing the composition. My invention computes the length of performance time when the time signature, the number of measures to be played, and the tempo markings are known. This is done by making settings on sliding scales and reading the answer on another scale. The settings and answer can be read through windows which may be labeled to make calculations simple and accurate.

Since there is a mathematical relationship between the elements of the time signature, the number of measures to be played, the tempo marking, and the length of performance time, my invention can be used to quickly and easily determine any of these elements when the other there were known. Therefore, in addition to determining the length of performance time, my invention will calculate the number of measures of a musical composition which should be played when the time signature, the tempo marking and the desired length of performance are known. My invention may also be used to determine the correct tempo marking when the time signature, the number of measures to be played, and the desired length of performance are known. Although four elements are involved in such calculations, there are only three practical combinations and answers as the time signature would be known in playing or writing music.

With the above and other objects in view, as will be presently apparent, the invention consists in general of certain novel details of construction and combinations of parts hereinafter fully described, illustrated in the accompanying drawings and particularly claimed.

In the drawings, like characters of reference indicate like parts in the several views, and FIGURE 1 is a front view on a reduced scale, showing the rectangular form or model of the invention, the scales 2, 3, 4, 5, 6, 9 and 10 being represented only by lines, and omitting the various printed legends;

FIGURE 2 is an upper edge view;

FIGURES 3, 4 and 5 are sectional views, on lines 3—3, 4—4 and 5—5 of FIGURE 1, respectively;

FIGURE 6 is an enlarged detail front view, showing any of the identical scales 2, 3, 4, 5 and 6 of the background or body 1;

FIGURE 7 is an enlarged front view showing the left end portion of the background 1 and its facing 20;

FIGURE 8 is an enlarged front elevation, partly in section, showing the slide 11 of FIGURE 1;

FIGURES 9, 9a, 9b, 9c, 9d and 9e jointly disclose an enlarged front view of the slide rule 8 of FIGURE 1, when successively placed end-to-end as indicated by the long arrows with curved ends;

FIGURE 10 is a front view of the circular form or model of the invention, the scales 24, 25, 28, 29, 30, 31 and 32 being indicated only by curved lines; and FIGURE 11 is an edge view as indicated by the arrow 11 of FIGURE 10.

*Construction of Rectangular Form or Model*

The rectangular background 1 serves as the body of the device. It must be of sufficient size to allow space for the Tempo Marking scales 2, 3, 4, 5, 6. Scales 2, 3, 4, 5, 6, are inscribed with numbers ranging from 40 to 208, which represent tempo markings in beats per minute. The background 1 is composed of pressboard, stout cardboard, celluloid, plastic or similar material. A slot 7 is provided for a sliding rule 8 which is inscribed with the Number of Minutes For Performance scale 9 and the Number of Measures scale 10. Rule 8 is made of material similar to, or the same as, background 1. The Number of Minutes For Performance scale 9 is inscribed with numbers ranging from 12 seconds to 40 minutes, which represent the length of performance time of a musical composition. The Number of Measures scale 10 is inscribed with numbers ranging from 1 to 300, which represent the number of measures of a musical composition to be played. The slide 11 covers background 1 and rule 8. Slide 11 is made of material similar to, or the same as, background 1. Slide 11 is allowed to move paralled to scales 2, 3, 4, 5, 6, so that the numbers on scales 2, 3, 4, 5, 6, can be seen through the respective windows 12, 13, 14, 15, 16, of slide 11. The upper portion of slide 11 is inscribed Tempo Marking, and window 12 is indicated for use with compositions of Two-four and Cut-time. Window 13 is indicated for Three-four and Three-eight time; window 14 is indicated for Four-four and Four-eight time; window 15 is indicated for Five-four and Five-eight time; and window 16 is indicate for Six-four and Six-eight time. Hairline 17 extends from just above the center of window 12 to just below the center of window 16. Exact points on scales 2, 3, 4, 5, 6, are determined by their proximity to hairline 17, when seen through windows 12, 13, 14, 15, 16, respectively. Window 18 in slide 11, inscribed Number of Measures, is aligned with scale 10, so that the number of measures to be played can be read through window 18. Hair-line 19 extends from just above the center of window 18 to just below the center of window 18. Exact points on scale 10 are determined by their proximity to hairline 19, when seen through window 18. Facing 20, a forwardly projecting portion on the body or background 1, is attached to the front of background 1, at the left extremity, so that rule 8 slides under facing 20. Facing 20 is made of material similar to, or the same as, background 1. Window 21 in facing 20, inscribed Number of Minutes For Performance, is aligned with scale 9, so the Number of Minutes For Performance scale 9 can be read through window 21. Hairline 22 extends from just above the center of window 21 to just below the center of window 21. Exact points on scale 9 are determined by their proximity to hairline 22, when seen through window 21. To facilitate settings and reading of answers, slide 11 and facing 20 are preferably colored with a light tint. The color may be light blue or any desired color which will allow the letters and numbers of slide 11 and facing 20 to be clearly seen. The color is used to better outline windows 12, 13, 14, 15, 16, 18 and 21, and to make it easier to distinguish slide 11 and facing 20 from background 1 and scale 9.

Construction of Circular Form or Model

The circular background 23 serves as the body of the device. It must be of sufficient size to allow space for the Number of Measures scale 24 and the Number of Minutes for Performance scale 25. The Number of Measures scale 24 is inscribed with numbers ranging from 1 to 300, which represent the number of measures of a musical composition to be played. The Number of Minutes for Performance scale 25 is inscribed with numbers ranging from 12 seconds to 40 minutes, which represent the length of performance time of musical compositions. The background 23 is composed of pressboard, stout cardboard, celluloid, plastic or similar material. Disk 26, made of material similar to, or the same as, background 23 is held in place against background 23 by a rivet 27 which passes through the center of background 23, disk 26 and facing 36. Disk 26 is able to move in a circular direction about rivet 27 in contrast with background 23. Space is allowed on disk 26 for the Tempo Marking scales 28, 29, 30, 31, 32. Scales 28, 29, 30, 31, 32, are inscribed with numbers ranging from 40 to 208, which represent tempo markings in beats per minute. Disk 26 is slightly smaller than the background 23 to avoid interference in reading the numbers on scales 24 and 25. One section of disk 26, a facing or projection 33, extends beyond the periphery of disk 26. Facing 33 of disk 26 contains a window 34, inscribed Number of Minutes For Performance, which is aligned with scale 25 of background 23 so that the Number of Minutes For Performance can be read through window 34. Hairline 35 extends from just above the center of window 34 to just below the center of window 34. Exact positions on scale 25 are determined by their proximity to hairline 35 when seen through window 34. Facing 36, made of material similar to, or the same as, background 23, is held in place against disk 26 by rivet 27. Facing 36 is able to move in a circular direction about rivet 27, in contrast background 23 and disk 26. Facing 36 extends somewhat beyond the outer extremity of background 23, so that window 37 in facing 36 is aligned with scale 24 on background 23. Scale 24 is read through window 37 which is inscribed Number of Measures. Hairline 38 extends from just above the center of window 37 to just below the center of window 37. Exact points on scale 24 are determined by their proximity to hairline 38 when seen through window 37. By moving facing 36 in a circular direction about rivet 27, the numbers on scales 28, 29, 30, 31, 32, can be read through the respective windows 39, 40, 41, 42, 43. The lower portion of facing 36 is inscribed Tempo Marking. Window 39 is indicated for use with compositions of Two-four and Cut-time. Window 40 is indicated for Three-four and Three-eight time, window 41 is indicated for Four-four and Four-eight time, window 42 is indicated for Five-four and Five-eight time, and window 43 is indicated for Six-four and Six-eight time. Hairline 44 extends from just above the center of window 39 to just below the center of window 43. Exact points on scales 28, 29, 30, 31, 32, are determined by their proximity to hairline 44 when seen through windows 39, 40, 41, 42, 43, respectively. To facilitate settings and reading of answers, facing 23 and facing 36 may be colored with a light tint. The color may be of a light blue or any desired color which will allow the letters and numbers facing 33 and facing 36 to be clearly seen. The color is used to better outline windows 34, 37, 39, 40, 41, 42, 43, and make it easier to distinguish facing 33 and facing 36 from background 23 and disk 26.

The scales 24 and 25 correspond to the scales 10 and 9, respectively, above described; and the scales 28 to 32 correspond to the scales 2 and 6, above described. Illustration of the scales 10, 9 and 28 to 32, in detail, as done with scales 2 to 6, and 9 and 10, is, therefore unnecessary.

There are three distinct musical problems which can be solved with the aid of my invention. These problems and the procedures for solving the problems with the rectangular and circular models are as follows.

*Operation of the Rectangular Model (FIGURES 1 to 9e)*

In order to determine the length of performance time of a musical composition when the time signature, number of measures to be played and the tempo marking, are known: Select the window 12, 13, 14, 15 or 16, which corresponds to the time signature. In the window selected, a setting for the tempo marking will be made. Adjust slide 11 so that the hairline of the window selected is in line with the number of beats per minute that corresponds to the tempo at which the composition is to be played. Slide 11 will then remain in this position relative to background 1, during the remaining steps of solving the problem. Rule 8 is to be adjusted so that the number of measures to be played is in line with hairline 19 of window 18. The number of minutes for performance of the composition can then be read in window 21. The number of minutes and seconds for performance can be determined accurately by noting the relationship of the numbers on scale 9 to hairline 22 of window 21.

In order to determine the number of measures of a musical composition which should be played when the time signature, the tempo marking, and the predetermined length of performance time are known: Select the window 12, 13, 14, 15 or 16, which corresponds to the time signature. In the window selected, a setting for the tempo marking will be made. Adjust slide 11 so that the hairline of the window selected is in line with the number of beats per minute which corresponds to the tempo at which the composition is to be played. Slide 11 will then remain in this position relative to background 1, during the remaining steps of solving the problem. Rule 8 is to be adjusted so that the desired number of minutes and seconds for performance is in line with hairline 22 of window 21. The number of measures which should be played in order to have the desired length of performance time can then be determined by noting the relationship of the numbers on scales 10 to the hairline 19 of window 18.

In order to determine the correct tempo marking for a musical composition when the time signature, the number of measures to be played and the predetermined length of performance time are known: Rule 8 is to be adjusted so that the desired number of minutes and seconds for performance is in line with hairline 22 of window 21. Rule 8 will remain in this position relative to the background 1 during the remaining steps of solving the problem. The slide 11 is then to be adjusted so that the number of measures to be played is in line with hairline 19 of window 18. The correct tempo in beats per minute can then be read in window 12, 13, 14, 15 or 16, which corresponds to the time signature. The relationship of the hairline of the correct time signature window 12, 13, 14, 15 or 16, to the numbers on the scales, as seen through the window, will determine the correct tempo marking.

*Operation of the Circular Model (FIGURES 10 and 11)*

In order to determine the length of performance time of a musical composition when the time signature, number of measures to be played and the tempo marking are known: Select the window 39, 40, 41, 42 or 43, which corresponds to the time signature. In the window selected, a setting for the tempo marking will be made. Adjust facing 36 so that the hairline of the window selected is in line with the number of beats per minute that corresponds to the tempo at which the composition is to be played. Facing 36 will then remain in this position relative to disk 26 during the remaining steps of solving the problem. Background 23 is to be adjusted so that the number of measures to be played is in line with the hairline 38 of window 37. The number of minutes for performance can then be read in window 34. The number of minutes and seconds for performance can be determined accurately by noting the relationship of the numbers on scale 25 to the hairline of window 34.

In order to determine the number of measures of a musical composition which should be played when the time signature, the tempo marking and the predetermined length of performance time are known: Select the window 39, 40, 41, 42 or 43, which corresponds to the time signature. In the window selected, a setting for the tempo marking will be made. Adjust facing 36 so that the hairline of the window selected is in line with the number of beats per minute that corresponds to the tempo at which the composition is to be played. Facing 36 will then remain in this position relative to disk 26 during the remaining steps of solving the problem. The background 23 is to be adjusted so that the desired number of minutes and seconds for performance is in line with hairline 35 of window 34. The number of measures which should be played in order to have the desired length of performance time can then be determined by noting the relationship of the numbers on scale 24 to the hairline 38 of window 37.

In order to determine the correct tempo marking for a musical composition when the time signature, the number of measures to be played and the predetermined length of performance time are known: Disk 26 is to be adjusted so that the desired number of minutes and seconds for performance is in line with hairline 35 of window 34. Disk 26 will remain in this position relative to background 23 during the remaining steps of solving the problem. The facing 36 is then to be adjusted so that the number of measures to be played is in line with hairline 38 of window 37. The correct tempo in beats per minute can then be read in window 39, 40, 41, 42, or 43, which corresponds to the time signature. The relationship of the hairline of the correct time signature window 39, 40, 41, 42, or 43, to the numbers on the scale, as seen through the window, will determine the correct tempo marking.

*Placement of the Points and Numbers on the Scales and Location of Hairlines on the Musical Calculator*

The musical calculator is based upon the mathematical relationship that the number of beats of a musical composition, when divided by the tempo in beats per minute, will result in an answer which corresponds to the number of minutes for performance. On the rectangular model, points on scales 9 and 10 are placed a definite distance from point 1 on scales 9 and 10, and on scales 2, 3, 4, 5, 6, points are placed a definite distance from hairline 22. Distances from point 1 on scales 9 and 10, and from hairline 22 on scales 2, 3, 4, 5, 6, are measured in units which are determined by the size of the calculator which is desired. In the model submitted, one unit is 2 millimeters in length. On the circular model, points on scales 24 and 25 are placed a definite distance from point 1 on scales 24 and 25, and on scales 28, 29, 30, 31, 32, points are placed a definite distance from hairline 35. Distances from point 1 on scales 24 and 25 and from hairline 35 are measured in angle degrees with rivet 27 as a center.

On scale 2, point 40 represents 40 beats per minute in two-four and cut-time which corresponds to 20 measures that would be played in one minute. Point 40 is represented by the logarithm of 20 and is placed on scale 2, 130.103 units from hairline 22. Points on scale 2 are the number of units from hairline 22 as indicated by the logs in the two-four, cut-time table. On scale 28, point 40 represents 40 beats per minute in two-four and cut-time which corresponds to 20 measures that would be played in one minute. Point 40 is represented by the logarithm of 20 and is placed on scale 28, 130.103 degrees from hairline 35. Points on scale 28 are the number of degrees from hairline 35 as indicated by the logs in the two-four, cut-time table.

*Two-four, Cut-Time Table*

| Beats per minute | Log | Beats per minute | Log |
|---|---|---|---|
| 40 | 130.103 | 96 | 168.124 |
| 42 | 132.222 | 100 | 169.897 |
| 44 | 134.242 | 104 | 171.600 |
| 46 | 136.173 | 108 | 173.239 |
| 48 | 138.021 | 112 | 174.819 |
| 50 | 139.794 | 116 | 176.343 |
| 52 | 141.497 | 120 | 177.815 |
| 54 | 143.136 | 126 | 179.934 |
| 56 | 144.716 | 132 | 181.954 |
| 58 | 146.240 | 138 | 183.885 |
| 60 | 147.712 | 144 | 185.733 |
| 63 | 149.831 | 152 | 188.081 |
| 66 | 151.851 | 160 | 190.309 |
| 69 | 153.782 | 168 | 192.428 |
| 72 | 155.630 | 176 | 194.448 |
| 76 | 157.978 | 184 | 196.379 |
| 80 | 160.206 | 192 | 198.227 |
| 84 | 162.325 | 200 | 200.000 |
| 88 | 164.345 | 208 | 201.793 |
| 92 | 166.276 | | |

On scale 3, point 40 represents 40 beats per minute in three-four and three-eight time, which corresponds to 13.3 measures that would be played in one minute. Point 40 is represented by the logarithm of 13.3 and is placed on scale 3, 112.385 units from hairline 22. Points on scale 3 are the number of units from hairline 22 as indicated by the logs in the three-four, three-eight table. On scale 29, point 40 represents 40 beats per minute in three-four and three-eight time, which corresponds to 13.3 measures that would be played in one minute. Point 40 is represented by the logarithm of 13.3 and is placed on scale 29, 112.385 degrees from hairline 35 as indicated by the logs in the three-four, three-eight time table.

*Three-four, Three-eight Time Table*

| Beats per minute | Log | Beats per minute | Log |
|---|---|---|---|
| 40 | 112.385 | 96 | 150.515 |
| 42 | 114.613 | 100 | 152.244 |
| 44 | 116.435 | 104 | 153.908 |
| 46 | 118.469 | 108 | 155.630 |
| 48 | 120.412 | 112 | 157.171 |
| 50 | 122.011 | 116 | 158.659 |
| 52 | 125.803 | 120 | 160.206 |
| 54 | 125.527 | 126 | 162.325 |
| 56 | 126.951 | 132 | 164.345 |
| 58 | 128.556 | 138 | 166.276 |
| 60 | 130.103 | 144 | 168.124 |
| 63 | 132.222 | 152 | 170.415 |
| 66 | 134.242 | 160 | 172.673 |
| 69 | 136.173 | 168 | 174.819 |
| 72 | 138.021 | 176 | 176.790 |
| 76 | 140.312 | 184 | 178.746 |
| 80 | 142.488 | 192 | 180.618 |
| 84 | 144.716 | 200 | 182.347 |
| 88 | 146.687 | 208 | 184.073 |
| 92 | 148.572 | | |

On scale 4, point 40 represents 40 beats per minute in four-four and four-eight time, which corresponds to 10 measures that would be played in one minute. Point 40 is represented by the logarithm of 10 and is placed on scale 4, 100.00 units from hairline 22. Points on scale 4 are the number of units from hairline 22 as indicated by the logs in the four-four, four-eight time table. On scale 30, point 40 represents 40 beats per minute in four-four and four-eight time, which corresponds to 10 measures that would be played in one minute. Point 40 is represented by the logarithm of 10 and is placed on scale 30, 100.000 degrees from hairline 35 as indicated by the logs in the four-four, four-eight time table.

Four-four, Four-eight Time Table

| Beats per minute | Log | Beats per minute | Log |
|---|---|---|---|
| 40 | 100.000 | 96 | 138.021 |
| 42 | 102.119 | 100 | 139.794 |
| 44 | 104.139 | 104 | 141.497 |
| 46 | 106.070 | 108 | 143.136 |
| 48 | 107.918 | 112 | 144.716 |
| 50 | 109.691 | 116 | 146.240 |
| 52 | 111.394 | 120 | 147.712 |
| 54 | 113.033 | 126 | 149.831 |
| 56 | 114.613 | 132 | 151.851 |
| 58 | 116.137 | 138 | 153.782 |
| 60 | 117.609 | 144 | 155.630 |
| 63 | 119.590 | 152 | 157.978 |
| 66 | 121.748 | 160 | 160.206 |
| 69 | 123.553 | 168 | 162.325 |
| 72 | 125.527 | 176 | 164.345 |
| 76 | 127.875 | 184 | 166.276 |
| 80 | 130.103 | 192 | 168.124 |
| 84 | 132.222 | 200 | 169.897 |
| 88 | 134.242 | 208 | 171.600 |
| 92 | 136.173 | | |

On scale 5, point 40 represents 40 beats per minute in five-four and five-eight time, which corresponds to 8 measures that would be played in one minute. Point 40 is represented by the logarithm of eight and is placed on scale 5, 90.309 units from hairline 22. Points on scale 5 are the number of units from hairline 22, as indicated by the logs in the five-four, five-eight time table. On scale 31, point 40 represents 40 beats per minute in five-four and five-eight time, which corresponds to 8 measures that would be played in one minute. Point 40 is represented by the logarithm of 8 and is placed on scale 31, 90.309 degrees from hairline 35. Points on scale 31 are the number of degrees from hairline 35 as indicated by the logs in the five-four, five-eight time table.

Five-four, Five-eight Time Table

| Beats per minute | Log | Beats per minute | Log |
|---|---|---|---|
| 40 | 90.309 | 96 | 128.330 |
| 42 | 92.428 | 100 | 130.103 |
| 44 | 94.448 | 104 | 131.806 |
| 46 | 96.379 | 108 | 133.445 |
| 48 | 98.227 | 112 | 135.025 |
| 50 | 100.000 | 116 | 136.549 |
| 52 | 101.703 | 120 | 138.021 |
| 54 | 103.342 | 126 | 140.140 |
| 56 | 104.922 | 132 | 142.160 |
| 58 | 106.446 | 138 | 144.091 |
| 60 | 107.918 | 144 | 145.939 |
| 63 | 110.037 | 152 | 148.287 |
| 66 | 112.057 | 160 | 150.515 |
| 69 | 113.988 | 168 | 152.634 |
| 72 | 115.836 | 176 | 154.654 |
| 76 | 118.184 | 184 | 156.585 |
| 80 | 120.412 | 192 | 158.433 |
| 84 | 122.531 | 200 | 160.206 |
| 88 | 124.551 | 208 | 161.909 |
| 92 | 126.482 | | |

On scale 6, point 40 represents 40 beats per minute in six-four and six-eight time, which corresponds to 6.66 measures that would be played in one minute. Point 40 is represented by the logarithm of 6.66 and is placed on scale 6, 82.347 units from hairline 22. Points on scale 6 are the number of units from hairline 22 as indicated by the logs in the six-four, six-eight time table. On scale 32, point 40 represents 40 beats per minute in six-four and six-eight time, which corresponds to 6.66 measures that would be played in one minute. Point 40 is represented by the logarithm of 6.66 and is placed on scale 32, 82.347 degrees from hairline 35. Points on scale 32 are the number of degrees from hairline 35, as indicated by the logs in the six-four, six-eight time table.

Six-four, Six-eight Time Table

| Beats per minute | Log | Beats per minute | Log |
|---|---|---|---|
| 40 | 82.347 | 96 | 120.412 |
| 42 | 84.510 | 100 | 122.011 |
| 44 | 86.510 | 104 | 123.805 |
| 46 | 88.423 | 108 | 125.527 |
| 48 | 90.309 | 112 | 126.951 |
| 50 | 92.065 | 116 | 128.556 |
| 52 | 93.752 | 120 | 130.103 |
| 54 | 95.424 | 126 | 132.222 |
| 56 | 96.988 | 132 | 134.242 |
| 58 | 98.498 | 138 | 136.173 |
| 60 | 100.000 | 144 | 138.021 |
| 63 | 102.119 | 152 | 140.312 |
| 66 | 104.139 | 160 | 142.488 |
| 69 | 106.070 | 168 | 144.716 |
| 72 | 107.918 | 176 | 146.687 |
| 76 | 110.037 | 184 | 148.572 |
| 80 | 110.037 | 192 | 150.515 |
| 84 | 114.613 | 200 | 152.244 |
| 88 | 116.435 | 208 | 153.908 |
| 92 | 118.469 | | |

In determining points on scale 9, the number of minutes and seconds were expressed in decimal form and then placed on scale 9 a distance from the one minute point according to the logarithm of the decimal. Minutes and seconds greater than one minute are the number of units from the one minute point as indicated by the logs in the number of minutes for performance table. Points which represent seconds less than one minute are placed on scale 9, the number of units from the one minute point which corresponds to the difference of the logs in the number of minutes for performance table and the log of the one minute point. In determining points on scale 25, the number of minutes and seconds were expressed in decimal form and then placed on scale 25, the number of degrees from the one minute point according to the logarithm of the decimal. Minutes and seconds greater than one minute are the number of degrees from the one minute point as indicated by the logs in the number of minutes for performance table. Points which represent seconds less than one minute, are placed on scale 25 the number of degrees from the one minute point which corresponds to the difference of the logs in the number of minutes for performance table and the log of the one minute point.

Number of Minutes for Performance Table

| Minutes | Seconds | Log | Minutes | Seconds | Log |
|---|---|---|---|---|---|
| ----- | 12 | 30.103 | ----- | 53 | 94.596 |
| ----- | 13 | 33.445 | ----- | 54 | 95.424 |
| ----- | 14 | 36.736 | ----- | 55 | 96.190 |
| ----- | 15 | 39.794 | ----- | 56 | 96.988 |
| ----- | 16 | 42.488 | ----- | 57 | 97.772 |
| ----- | 17 | 45.179 | ----- | 58 | 98.498 |
| ----- | 18 | 47.712 | ----- | 59 | 99.255 |
| ----- | 19 | 49.969 | 1 | ----- | 100.000 |
| ----- | 20 | 52.244 | 1 | 3 | 2.119 |
| ----- | 21 | 54.407 | 1 | 6 | 4.139 |
| ----- | 22 | 56.348 | 1 | 9 | 6.070 |
| ----- | 23 | 58.320 | 1 | 12 | 7.918 |
| ----- | 24 | 60.206 | 1 | 15 | 9.691 |
| ----- | 25 | 61.909 | 1 | 18 | 11.394 |
| ----- | 26 | 63.649 | 1 | 21 | 13.033 |
| ----- | 27 | 65.321 | 1 | 24 | 14.613 |
| ----- | 28 | 66.893 | 1 | 27 | 16.137 |
| ----- | 29 | 68.395 | 1 | 30 | 17.609 |
| ----- | 30 | 69.897 | 1 | 33 | 19.033 |
| ----- | 31 | 71.265 | 1 | 36 | 20.412 |
| ----- | 32 | 72.673 | 1 | 39 | 21.748 |
| ----- | 33 | 74.036 | 1 | 42 | 23.045 |
| ----- | 34 | 75.282 | 1 | 45 | 24.304 |
| ----- | 35 | 76.567 | 1 | 48 | 25.527 |
| ----- | 36 | 77.815 | 1 | 51 | 26.717 |
| ----- | 37 | 78.958 | 1 | 54 | 27.875 |
| ----- | 38 | 80.140 | 1 | 57 | 29.003 |
| ----- | 39 | 81.291 | 2 | ----- | 30.103 |
| ----- | 40 | 82.347 | 2 | 3 | 31.175 |
| ----- | 41 | 83.442 | 2 | 6 | 32.222 |
| ----- | 42 | 84.510 | 2 | 9 | 33.244 |
| ----- | 43 | 85.491 | 2 | 12 | 34.242 |
| ----- | 44 | 86.510 | 2 | 15 | 35.218 |
| ----- | 45 | 87.506 | 2 | 18 | 36.173 |
| ----- | 46 | 88.423 | 2 | 21 | 37.107 |
| ----- | 47 | 89.376 | 2 | 24 | 38.021 |
| ----- | 48 | 90.309 | 2 | 27 | 38.917 |
| ----- | 49 | 91.169 | 2 | 30 | 39.794 |
| ----- | 50 | 92.065 | 2 | 33 | 40.654 |
| ----- | 51 | 92.942 | 2 | 36 | 41.497 |
| ----- | 52 | 93.752 | 2 | 39 | 42.325 |

*Number of Minutes for Performance Table—Continued*

| Minutes | Seconds | Log | Minutes | Seconds | Log |
|---|---|---|---|---|---|
| 2 | 42 | 43.136 | 7 | 30 | 87.506 |
| 2 | 45 | 43.933 | 7 | 45 | 88.930 |
| 2 | 48 | 44.716 | 8 | ----- | 90.309 |
| 2 | 51 | 45.484 | 8 | 15 | 91.645 |
| 2 | 54 | 46.240 | 8 | 30 | 92.942 |
| 2 | 57 | 46.982 | 8 | 45 | 94.201 |
| 3 | ----- | 47.712 | 9 | ----- | 95.424 |
| 3 | 3 | 48.430 | 9 | 15 | 96.614 |
| 3 | 6 | 49.136 | 9 | 30 | 97.772 |
| 3 | 9 | 49.831 | 9 | 45 | 98.900 |
| 3 | 12 | 50.515 | 10 | ----- | 100.000 |
| 3 | 15 | 51.188 | 10 | 30 | 102.119 |
| 3 | 18 | 51.851 | 11 | ----- | 104.139 |
| 3 | 21 | 52.504 | 11 | 30 | 106.070 |
| 3 | 24 | 53.148 | 12 | ----- | 107.918 |
| 3 | 27 | 53.782 | 12 | 30 | 109.691 |
| 3 | 30 | 54.407 | 13 | ----- | 111.394 |
| 3 | 33 | 55.023 | 13 | 30 | 113.033 |
| 3 | 36 | 55.630 | 14 | ----- | 114.613 |
| 3 | 39 | 56.229 | 14 | 30 | 116.137 |
| 3 | 42 | 56.820 | 15 | ----- | 117.609 |
| 3 | 45 | 57.403 | 15 | 30 | 119.033 |
| 3 | 48 | 57.978 | 16 | ----- | 120.412 |
| 3 | 51 | 58.546 | 16 | 30 | 121.748 |
| 3 | 54 | 59.106 | 17 | ----- | 123.045 |
| 3 | 57 | 59.660 | 17 | 30 | 124.304 |
| 4 | ----- | 60.206 | 18 | ----- | 125.527 |
| 4 | 3 | 60.746 | 18 | 30 | 126.717 |
| 4 | 6 | 61.278 | 19 | ----- | 127.875 |
| 4 | 9 | 61.805 | 19 | 30 | 129.003 |
| 4 | 12 | 62.325 | 20 | ----- | 130.103 |
| 4 | 15 | 62.839 | 20 | 30 | 131.175 |
| 4 | 18 | 63.347 | 21 | ----- | 132.222 |
| 4 | 21 | 63.849 | 21 | 30 | 133.244 |
| 4 | 24 | 64.345 | 22 | ----- | 134.242 |
| 4 | 27 | 64.836 | 22 | 30 | 135.218 |
| 4 | 30 | 65.321 | 23 | ----- | 136.173 |
| 4 | 33 | 65.801 | 23 | 30 | 137.107 |
| 4 | 36 | 66.276 | 24 | ----- | 138.021 |
| 4 | 39 | 66.745 | 24 | 30 | 138.917 |
| 4 | 42 | 67.210 | 25 | ----- | 139.794 |
| 4 | 45 | 67.669 | 26 | ----- | 141.497 |
| 4 | 48 | 68.124 | 27 | ----- | 143.136 |
| 4 | 51 | 68.574 | 28 | ----- | 144.716 |
| 4 | 54 | 69.020 | 29 | ----- | 146.240 |
| 4 | 57 | 69.461 | 30 | ----- | 147.712 |
| 5 | ----- | 69.897 | 31 | ----- | 149.136 |
| 5 | 15 | 72.016 | 32 | ----- | 150.515 |
| 5 | 30 | 74.036 | 33 | ----- | 151.851 |
| 5 | 45 | 75.967 | 34 | ----- | 153.148 |
| 6 | ----- | 77.815 | 35 | ----- | 154.407 |
| 6 | 15 | 79.588 | 36 | ----- | 155.630 |
| 6 | 30 | 81.291 | 37 | ----- | 156.820 |
| 6 | 45 | 82.930 | 38 | ----- | 157.978 |
| 7 | ----- | 84.510 | 39 | ----- | 159.106 |
| 7 | 15 | 86.034 | 40 | ----- | 160.206 |

The one measure point on scale 10 is in direct alignment with the one minute point on scale 9. In determining points on scale 10, the points for the number of measures are placed a distance from the one measure point according to the logarithm of the number of measures to be played. Points on scale 10 are the number of units from the one measure point as indicated by the logs in the number of measures table. The one measure point on scale 24 is in direct alignment wtih the one minute point on scale 25. In determining points on scale 24, the points for the number of measures are placed a number of degrees from the one measure point according to the logarithm of the number of measures to be played. Points on scale 24 are the number of degrees from the one measure point as indicated by the logs in the number of measures table.

*Number of Measures Table*

| Measures | Log | Measures | Log |
|---|---|---|---|
| 1 | 00.000 | 17 | 123.045 |
| 2 | 30.103 | 18 | 125.527 |
| 3 | 47.712 | 19 | 127.875 |
| 4 | 60.206 | 20 | 130.103 |
| 5 | 69.897 | 21 | 132.222 |
| 6 | 77.815 | 22 | 134.242 |
| 7 | 84.510 | 23 | 136.173 |
| 8 | 90.309 | 24 | 138.021 |
| 9 | 95.424 | 25 | 139.794 |
| 10 | 100.000 | 26 | 141.497 |
| 11 | 104.139 | 27 | 143.136 |
| 12 | 107.918 | 28 | 144.716 |
| 13 | 111.394 | 29 | 146.240 |
| 14 | 114.613 | 30 | 147.712 |
| 15 | 117.609 | 31 | 149.136 |
| 16 | 120.412 | 32 | 150.515 |

*Number of Measures Table—Continued*

| Measures | Log | Measures | Log |
|---|---|---|---|
| 34 | 153.148 | 108 | 203.342 |
| 36 | 155.630 | 112 | 204.922 |
| 38 | 157.978 | 116 | 206.446 |
| 40 | 160.206 | 120 | 207.918 |
| 42 | 162.325 | 124 | 209.342 |
| 44 | 164.345 | 128 | 210.721 |
| 46 | 166.276 | 132 | 212.057 |
| 48 | 168.124 | 136 | 213.354 |
| 50 | 169.897 | 140 | 214.163 |
| 52 | 171.600 | 144 | 215.836 |
| 54 | 173.239 | 148 | 217.026 |
| 56 | 174.819 | 152 | 218.184 |
| 58 | 176.343 | 156 | 219.312 |
| 60 | 177.815 | 160 | 220.412 |
| 62 | 179.239 | 164 | 221.484 |
| 64 | 180.618 | 168 | 222.531 |
| 66 | 181.954 | 172 | 223.553 |
| 68 | 183.251 | 176 | 224.551 |
| 70 | 184.510 | 180 | 225.527 |
| 72 | 185.733 | 184 | 226.482 |
| 74 | 186.923 | 188 | 227.416 |
| 76 | 188.081 | 192 | 228.330 |
| 78 | 189.209 | 196 | 229.226 |
| 80 | 190.309 | 200 | 230.103 |
| 82 | 191.381 | 210 | 232.232 |
| 84 | 192.428 | 220 | 234.242 |
| 86 | 193.450 | 230 | 236.173 |
| 88 | 194.448 | 240 | 238.021 |
| 90 | 195.424 | 250 | 239.794 |
| 92 | 196.379 | 260 | 241.497 |
| 94 | 197.313 | 270 | 243.136 |
| 96 | 198.227 | 280 | 244.716 |
| 98 | 199.123 | 290 | 246.240 |
| 100 | 200.000 | 300 | 247.712 |
| 104 | 201.703 | | |

While there is herein shown and described the preferred embodiments of the invention, it is nevertheless to be understood that variations may be made without departing from the spirit and scope of the invention as claimed.

I claim:

1. A musical calculator for use wherein time signature, tempo, number of measures and length of performance time are possible known factors and wherein when three of the factors are known the other may be readily determined; said musical calculator comprising a fixed body member, a strip member movable relative to said body member, a slide overlying said body member and said strip member and mounted on said body member for movement relative to said body member and said strip member, and said body member having a fixed portion overlying said strip member, a plurality of lines of tempo indicating indicia on said body member, a plurality of first openings in said slide, each of said first openings being aligned with a respective one of said lines of tempo indicating indicia, each of said first openings representing a time signature, separate lines of indicia on said strip member indicating number of measures and length of performance time, a second opening in said slide aligned with said line of indicia indicating number of measures, and a third opening in said body member fixed portion aligned with said line of indicia indicating length of performance time, each of said openings having a reference line associated therewith.

2. The musical calculator of claim 1 wherein the reference lines of all of said first openings are in alignment.

3. The musical calculator of claim 2 wherein the reference line of said second opening is aligned with the reference lines of said first openings.

4. The musical calculator of claim 1 wherein the indicia of each of said lines of tempo indicating indicia is referenced on said third opening reference line.

5. The musical calculator of claim 1 wherein said body member is elongated and has a longitudinal recess therein, said body member fixed portion is adjacent one end of said body member and overlies said recess, and said strip member is elongated and is seated in said recess.

6. The musical calculator of claim 1 wherein said body member is in the form of a flat disc, said strip member being an annular outer portion of a second disc having a common center with said flat disc and being rotatable relative thereto, said strip member being disposed outwardly of said flat disc in surrounding relation, said body member being a radial extension of said flat disc, and said slide being pivoted at the center of said flat disc; said flat disc, said second disc and said slide having a common pivot.

References Cited in the file of this patent

UNITED STATES PATENTS

| | | |
|---|---|---|
| 746,888 | Smith | Dec. 15, 1903 |
| 2,437,621 | Strate | Mar. 9, 1948 |
| 2,634,054 | Higgins et al. | Apr. 7, 1953 |
| 2,832,252 | Gabriel | Apr. 29, 1958 |